(12) United States Patent
Harter

(10) Patent No.: US 7,784,704 B2
(45) Date of Patent: Aug. 31, 2010

(54) SELF-PROGRAMMABLE THERMOSTAT

(76) Inventor: Robert J. Harter, 4233 Cliffside Dr., La Crosse, WI (US) 54601

( * ) Notice: Subject to any disclaimer, the term of this patent is extended or adjusted under 35 U.S.C. 154(b) by 871 days.

(21) Appl. No.: 11/704,414

(22) Filed: Feb. 9, 2007

(65) Prior Publication Data
US 2008/0191045 A1 Aug. 14, 2008

(51) Int. Cl.
G05D 23/32 (2006.01)
G05D 23/00 (2006.01)

(52) U.S. Cl. ..................... 236/1 C; 236/44 C

(58) Field of Classification Search ............. 236/46 R, 236/46 C, 1 C, 44 C
See application file for complete search history.

(56) References Cited

U.S. PATENT DOCUMENTS

| | | | | |
|---|---|---|---|---|
| 4,335,847 A | * | 6/1982 | Levine | 236/46 R |
| 4,350,966 A | | 9/1982 | Nelson | |
| 4,467,178 A | * | 8/1984 | Swindle | 392/449 |
| 4,469,274 A | * | 9/1984 | Levine | 236/46 R |
| 4,531,064 A | * | 7/1985 | Levine | 307/66 |
| 4,669,654 A | | 6/1987 | Levine et al. | |
| 4,751,961 A | | 6/1988 | Levine et al. | |
| 5,056,712 A | * | 10/1991 | Enck | 236/20 R |
| 5,088,645 A | * | 2/1992 | Bell | 236/46 R |
| 5,115,967 A | * | 5/1992 | Wedekind | 236/46 R |
| 5,165,465 A | * | 11/1992 | Kenet | 165/11.1 |
| 5,170,935 A | * | 12/1992 | Federspiel et al. | 236/44 C |
| 5,902,183 A | | 5/1999 | D'Souza | |
| 5,943,917 A | | 8/1999 | Truong et al. | |
| 6,375,087 B1 | | 4/2002 | Day et al. | |
| 6,741,158 B2 | | 5/2004 | Engler et al. | |
| D506,150 S | | 6/2005 | Backlund et al. | |
| D506,689 S | | 6/2005 | Backlund et al. | |
| 2003/0040842 A1 | | 2/2003 | Poth | |
| 2010/0025483 A1 | * | 2/2010 | Hoeynck et al. | 236/1 C |

* cited by examiner

Primary Examiner—Frantz F. Jules
Assistant Examiner—Alexis K Cox
(74) Attorney, Agent, or Firm—www.bobharter; Robert J. Harter

(57) ABSTRACT

A hybrid manual/programmable thermostat for a furnace or air conditioner offers the simplicity of a manual thermostat while providing the convenience and versatility of a programmable one. Initially, the hybrid thermostat appears to function as an ordinary manual thermostat; however, it privately observes and learns a user's manual temperature setting habits and eventually programs itself accordingly. If users begin changing their preferred temperature settings due to seasonal changes or other reasons, the thermostat continues learning and will adapt to those changes as well. For ease of use, the thermostat does not require an onscreen menu as a user interface. In some embodiments, the thermostat can effectively program itself for temperature settings that are set to occur at particular times daily or just on weekends, yet the user is not required to enter the time of day or the day of the week.

5 Claims, 3 Drawing Sheets

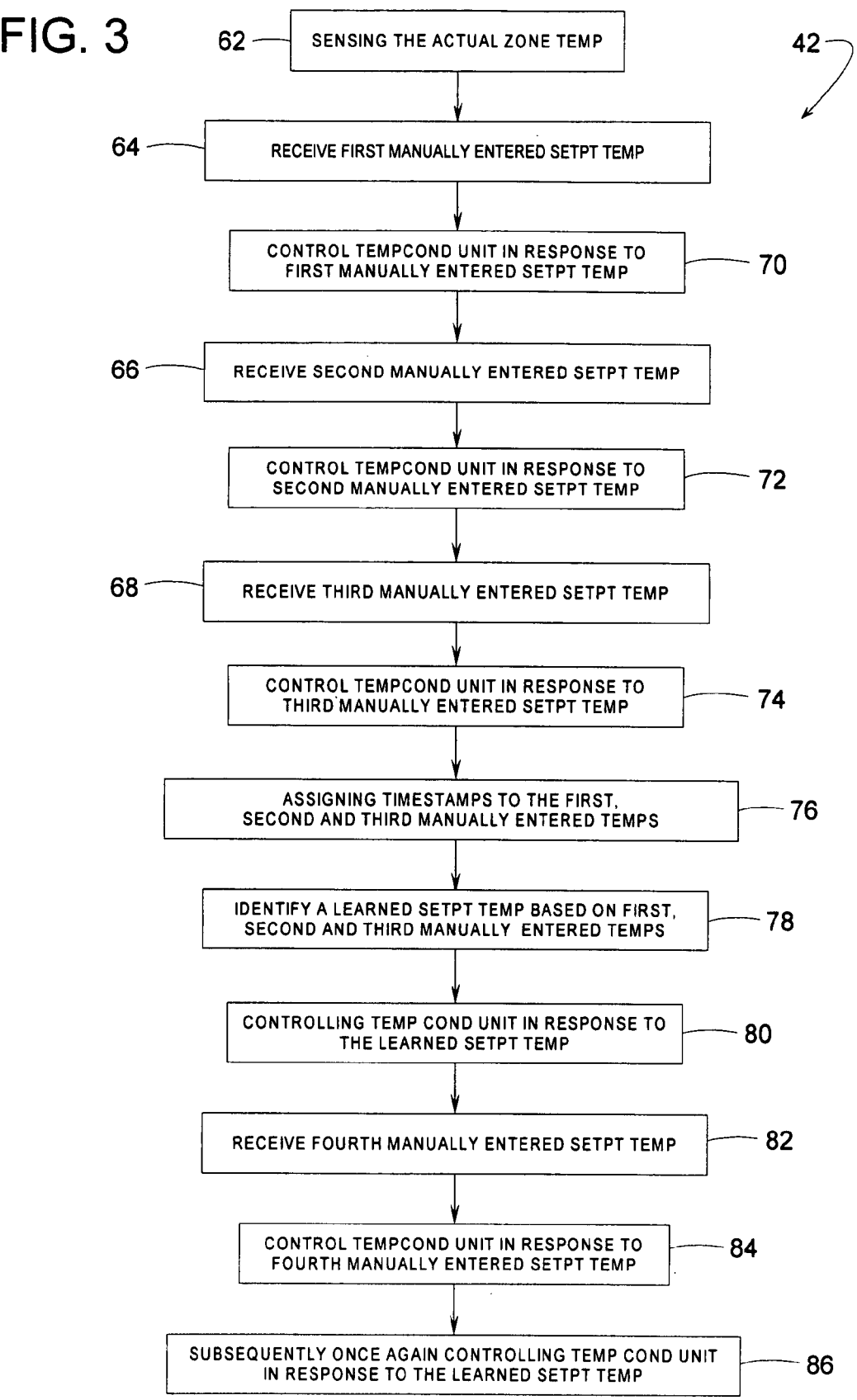

SELF-PROGRAMMABLE THERMOSTAT

FIELD OF THE INVENTION

The subject invention generally pertains to a room or building thermostat and more specifically to a method of programming such a thermostat, wherein the thermostat can in effect program itself for various daily and/or weekly temperature setpoints upon learning temperature setting habits of a user and can do such self-programming without ever knowing the actual time of day or day of the week.

BACKGROUND OF RELATED ART

Furnaces, air conditioners and other types of temperature conditioning units typically respond to a thermostat in controlling the air temperature of a room or other area of a building. Currently, thermostats can be classified as manual or programmable.

With manual thermostats, a user manually enters into the thermostat a desired temperature setpoint, and then thermostat controls the temperature conditioning unit to bring the actual room temperature to that setpoint. At various times throughout the day, the user might adjust the setpoint for comfort or to save energy. When operating in a heating mode, for instance, a user might lower the setpoint temperature at night and raise it again in the morning. Although manual thermostats are easy to understand and use, having to repeatedly adjust the setpoint manually can be a nuisance.

Programmable thermostats, on the other hand, can be programmed to automatically adjust the setpoint to predetermined temperatures at specified times. The specified times can initiate automatic setpoint adjustments that occur daily such as on Monday-Friday, or the adjustments might occur weekly on days such as every Saturday or Sunday. For a given day, programmable thermostats can also be programmed to make multiple setpoint adjustments throughout the day, such as at 8:00 AM and 11:00 PM on Saturday or at 6:00 AM and 10 PM on Monday through Friday. Such programming, however, can be confusing as it can involve several steps including: 1) synchronizing the thermostat's clock with the current time of day; 2) entering into the thermostat the current date or day of the week; and 3) entering various chosen days, times and setpoint temperatures. One or more of these steps may need to be repeated in the event of daylight savings time, electrical power interruption, change in user preferences, and various other reasons.

Consequently, there is a need for a thermostat that offers the simplicity of a manual thermostat while providing the convenience and versatility of a programmed thermostat.

SUMMARY OF THE INVENTION

An object of the invention is to provide an essentially self-programmable thermostat for people that do not enjoy programming conventional programmable thermostats.

An object of some embodiments of the invention is to provide a programmable thermostat that does not rely on having to know the time of day, thus a user does not have to enter that.

Another object of some embodiments is to provide a programmable thermostat with both daily and weekly occurring settings, yet the thermostat does not rely on having to know the day of the week, thus a user does not have to enter that.

Another object of some embodiments is to provide a programmable thermostat that does not rely on onscreen menus for programming.

Another object of some embodiments is to provide a thermostat that effectively programs itself as it is being used as a manual thermostat.

Another object of some embodiments is to provide a thermostat that automatically switches from a manual mode to a programmed mode when it recognizes an opportunity to do so.

Another object of some embodiments is to provide a thermostat that automatically switches from a programmed mode to a manual mode simply by manually entering a new desired setpoint temperature.

Another object of some embodiments is to observe and learn the temperature setting habits of a user and automatically program a thermostat accordingly.

Another object of some embodiments is to provide a self-programming thermostat that not only learns a user's temperature setting habits, but if those habits or temperature-setting preferences change over time, the thermostat continues learning and will adapt to the new habits and setpoints as well.

Another object of some embodiments is to minimize the number of inputs and actions from which a user can choose, thereby simplifying the use of a thermostat.

Another object of some embodiments is to provide a thermostat that can effectively self-program virtually an infinite number of setpoint temperatures and times, rather than be limited to a select few number of preprogrammed settings.

Another object of some embodiments is to provide a simple way of clearing programmed settings of a thermostat.

One or more of these and/or other objects of the invention are provided by a thermostat and method that learns the manual temperature setting habits of a user and programs itself accordingly.

BRIEF DESCRIPTION OF THE DRAWINGS

FIG. 3 shows another example of algorithm for a thermostat method.

DESCRIPTION OF THE PREFERRED EMBODIMENT

Figure 1:
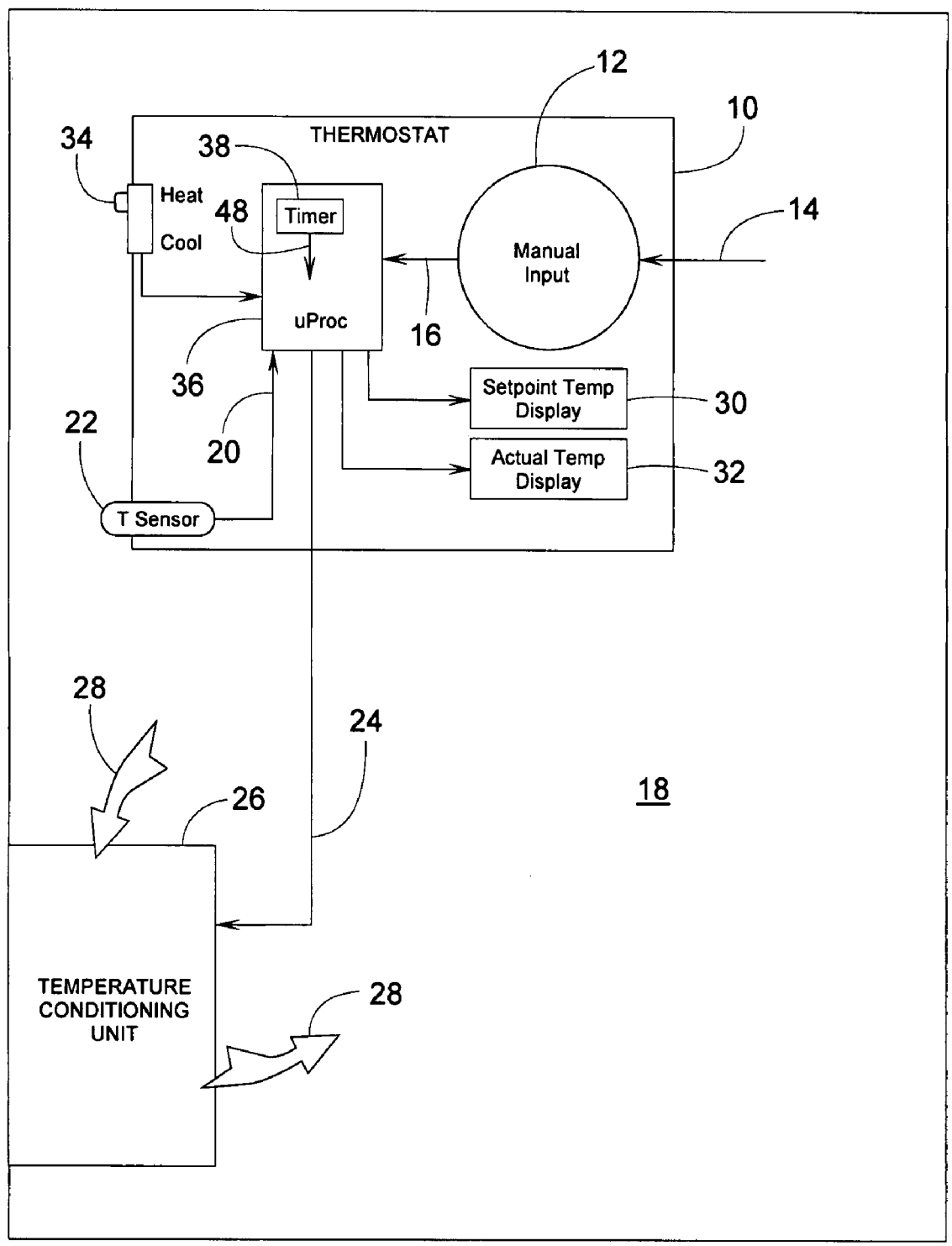
FIG. 1 is a schematic view of a thermostat controlling a temperature conditioning unit.
Figure 2:
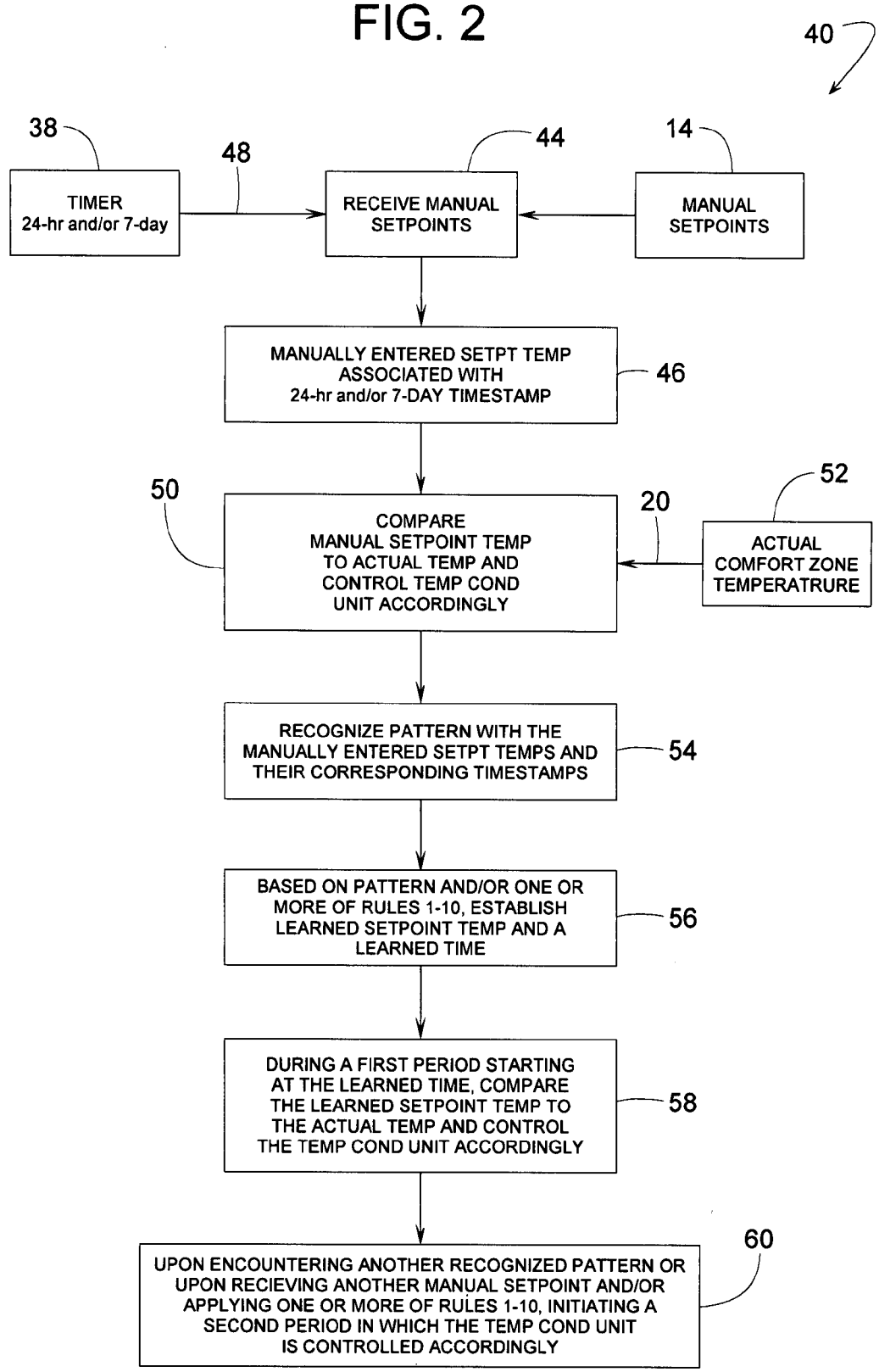
FIG. 2 shows an example of algorithm for a thermostat method.

FIGS. 1-3 show a thermostat 10 and a method for automatically programming it. Initially, thermostat 10 might first appear and function as an ordinary manual thermostat. Thermostat 10, for instance, includes a manual input 12 (e.g., dial, keyboard, pointer, slider, potentiometer, pushbutton, etc.) that enables a user to manually enter a manual setpoint 14 that defines a manually entered setpoint temperature 16. The manually entered setpoint temperature 16 is the user's desired target temperature for a comfort zone 18. Upon comparing the manually entered setpoint temperature 16 to the comfort zone's actual temperature 20 (provided by a temperature sensor 22), thermostat 10 provides an output signal 24 that controls a temperature conditioning unit 26 (e.g., furnace, heater, air conditioner, heat pump, etc.) to heat or cool air 28 in comfort zone 18, thereby urging the comfort zone's actual temperature 20 toward the manually entered setpoint temperature 16.

A digital display 30 can be used for displaying the current setpoint temperature, and another display 32 can show the comfort zone's actual temperature. Displays 30 and 32 could be combined into a single display unit, wherein the combined display unit could show the current setpoint temperature and the zone's actual temperature simultaneously or in an alternating manner. Thermostat 10 might also include a selector switch 34 for manually switching between a cooling mode for cooling zone 18 and a heating mode for heating zone 18. Items such as display 30, selector switch 34, manual input 12, and output 24 are well known to those of ordinary skill in the art. One or more of such items, for example, can be found in a model CT8775C manual thermostat provided by Honeywell Inc. of Golden Valley, Minn.

Although thermostat 10 can operate as a regular manual thermostat by controlling unit 26 as a function of a differential between the actual zone temperature and the most recently entered manual setpoint temperature, thermostat 10 includes a microprocessor 36 (e.g., computer, CPU, firmware programmed chip, etc.) that enables thermostat 10 to observe the temperature setting habits of the user (e.g., person that manually enters setpoint temperatures into the thermostat). After several manual settings, microprocessor 36 may learn the user's preferred setpoint temperatures and timestamps them with the aide of a timer 38. With one or more learned setpoint temperatures and timestamps 48, microprocessor 36 can begin anticipating the user's desires and automatically adjust the thermostat's setpoint temperatures accordingly. Thus, thermostat 10 can begin operating as a programmed thermostat, rather than just a manual one.

Since a user's desired temperature setpoints and time preferences might change for various reasons, any manually entered setpoint temperature 16 overrides the currently active setpoint temperature regardless of whether the current setpoint temperature was manually entered or was automatically activated as a learned setpoint temperature. Once overridden, another learned setpoint temperature might later be activated at a learned time to return thermostat 10 back to its programmed mode. Thus, thermostat 10 is somewhat of a hybrid manual/programmable thermostat in that it can shift automatically between manual and programmed operation.

To assign timestamps 48 to manually entered setpoint temperatures, timer 38 can actually comprise one or more timers and/or counters. In some embodiments, for example, timer 38 includes a continuously running daily or 24-hour timer that resets itself every 24 hours. The time increments can be in minutes, seconds, or any preferred unit. In some cases, timer 38 is a continuously operating weekly or 168-hour timer that resets itself every seven days. The increments can be in days, hours, minutes, seconds, or any preferred unit. The weekly timer could also be a seven-increment counter that indexes one increment every 24 hours in response to a daily or 24-hour timer. Timer 38, however, is not necessarily synchronized with the actual time of day or day of the week. Such synchronization preferably is not required; otherwise the user might have to manually enter or set the correct time and day of the week.

In the case where timer 36 comprises a weekly timer in the form of a 7-increment counter triggered by each 24-hour cycle of a daily timer, timestamp 48 might a be a two-part number such as (X and Y) wherein X cycles from 1 to 7 as a weekly timer, and Y cycles from 0 to 1,439 (1,440 minutes per day) as a daily timer. In this case, a timestamp 48 might be (3 and 700) to indicate 700 minutes elapsed during day-3. Whether day-3 represents Monday, Tuesday or some other day is immaterial, and whether the 700-minute represents 2:00 AM, 7:30 PM or some other time of day is also immaterial. As one way to provide a programmable thermostat that can operate independently of an actual time of day clock and to provide thermostat 10 with other functionality, microprocessor 36 can be firmware programmed to execute one or more of the following rules:

Rule-1—Upon receiving a manually entered setpoint temperature, microprocessor assigns an (X and Y) timestamp 48 to the manually entered setpoint temperature, wherein the timestamp indicates when the setpoint temperature was entered relative to other timestamps. The manually entered setpoint temperature and its timestamp 48 are stored in memory for later reference.

Rule-2—Microprocessor 36 looks for patterns of manual setpoints, wherein each manual setpoint has a manually entered setpoint temperature and a timestamp 48.

A daily pattern, for example, can be defined as three consecutive days in which a series of three similar manually entered setpoint temperatures (e.g., within a predetermined deviation of perhaps 2° F. or 5° F. of each other) have similar daily timestamps 48 (e.g., each Y-value being within a predetermined deviation of perhaps 90 minutes of each other). Such a daily pattern can then be assigned a learned daily setpoint temperature and a learned daily time. The learned daily setpoint temperature could be, for example, an average of the three similar manually entered setpoints temperatures or the most recent of the three. The learned daily time could be, for example, 20 minutes before the three similar timestamps. For future automatic settings, the 20 minutes might allow microprocessor 36 to activate the learned daily setpoint temperature before the user would normally want to adjust the setpoint.

A weekly pattern, for example, can be defined as three manual setpoints spaced 7 days apart (e.g., same X-value after one complete 7-day cycle) in which three similar manually entered setpoint temperatures (e.g., within 2° F. or 5° F. of each other) have similar timestamps 48 (e.g., each Y-value being within 90 minutes of each other). Such a weekly pattern can then be assigned a learned weekly setpoint temperature and a learned weekly time. The learned weekly setpoint temperature could be, for example, an average of the three similar manually entered setpoints temperatures spaced 7 days apart or the most recent of the three. The learned time could be, for example, 20 minutes before the three similar timestamps.

Rule-3—Automatically activate a learned daily setpoint temperature at its learned daily time (at its assigned Y-value), whereby thermostat 10 controls unit 26 based on the learned daily setpoint temperature and continues to do so until interrupted by one of the following: a) the user enters a manually entered setpoint temperature (adjusts the temp), b) another learned daily setpoint temperature becomes activated at its learned daily time, or c) a learned weekly setpoint temperature becomes activated at its learned weekly time.

Rule-4—Automatically activate a learned weekly setpoint temperature at its learned weekly time (at its assigned X and Y values), whereby thermostat 10 controls unit 26 based on the learned weekly setpoint temperature and continues to do so until interrupted by one of the following: a) the user enters a manually entered setpoint temperature (adjusts the temp), b) a learned daily setpoint temperature becomes activated at its learned daily time (but see Rule-5), or c) another learned weekly setpoint temperature becomes activated at its learned weekly time.

Rule-5—A weekly pattern overrides or supersedes a daily pattern if their assigned timestamps 48 are within a predetermined period of each other such as, for example, within three hours of each other based on the Y-values of their timestamps.

Rule-6—If a user enters a manually entered setpoint temperature, thermostat 10 controls unit 26 in response to the manually entered setpoint temperature and continues to do so until interrupted by one of the following: a) the user enters another manually entered setpoint temperature (adjusts the temp), b) a learned daily setpoint temperature becomes activated at its learned daily time, or c) a learned weekly setpoint temperature becomes activated at its learned weekly time.

Rule-7—If a user enters two manually entered setpoint temperatures within a predetermined short period of each other, e.g., within 90 minutes of each other, the first of the two manual entries is disregarded as being erroneous and is not to be considered as part of any learned pattern.

Rule-8—If a learned daily setpoint temperature is activated at a learned time and is soon interrupted by the user entering a manually entered setpoint temperature within a predetermined short period (e.g., within 3 hours), and this occurs a predetermined number of days in a row (e.g., 3 days in a row as indicated by the X-value of timer 38), then the daily pattern associated with the learned daily setpoint temperature is erased from the memory.

Rule-9—If a learned weekly setpoint temperature is activated at a learned time and is soon interrupted by the user entering a manually entered setpoint temperature within a predetermined short period (e.g., within 3 hours), and this occurs a predetermined number of weeks in a row (e.g., 2 weeks in a row as indicated by an additional counter that counts the cycles of the X-value of timer 38), then the weekly pattern associated with the learned weekly setpoint temperature is erased from the memory.

Rule-10—Actuating switch 34 between cool and heat or actuating some other manual input can be used for erasing the entire collection of learned data.

Rules 1-10 might be summarized more concisely but perhaps less accurately as follows:

1) Assign timestamps 48 to every manually entered setpoint temperature.

2) Identify daily patterns (similar manually entered temperatures and times 3 days in a row), and identify weekly patterns (3 similar manually entered temperatures and times each spaced a week apart). Based on those patterns, establish learned setpoint temperatures and learned times.

3) Activate learned daily setpoints at learned times, and keep them active until the activated setpoint is overridden by the next learned setpoint or interrupted by a manually entered setpoint.

4) Activate learned weekly setpoints at learned times, and keep them active until the activated setpoint is overridden by the next learned setpoint or interrupted by a manually entered setpoint.

5) If a learned weekly setpoint and a learned daily setpoint are set to occur near the same time on given day, the learned daily setpoint is ignored on that day because the day is probably a Saturday or Sunday.

6) Whenever the user manually adjusts the temperature, the manually entered setpoint temperature always overrides the currently active setting. The manually entered setpoint remains active until it is interrupted by a subsequent manual or learned setting.

7) If a user repeatedly tweaks or adjusts the temperature within a short period, only the last manually entered setpoint temperature is used for learning purposes, as the other settings are assumed to be trial-and-error mistakes by the user.

8) If a user has to repeatedly correct a learned daily setpoint (e.g., correct it 3 days in a row), that learned setpoint is deleted and no longer used. Using 3 days as the cutoff avoids deleting a good daily pattern due to 2 days of corrections over a weekend.

9) If a user has to repeatedly correct a learned weekly setpoint (e.g., correct it 2 weeks in a row), that learned setpoint is deleted and no longer used.

10) Switching between heating and cooling, for at least 5 seconds or so, deletes the entire collection of learned data.

To execute one or more of the aforementioned rules, microprocessor 36 could operate under the control of various algorithms, such as, for example, an algorithm 40 of FIG. 2, an algorithm 42 of FIG. 3, a combination of algorithms 40 and 42, or another algorithm altogether.

Referring to the example of FIG. 2, a block 44 represents receiving a plurality of manual setpoints 14 that are manually entered at various points in time over a period, each of the manual setpoints 14 provides a manually entered setpoint temperature 16 that in block 46 becomes associated with a timestamp 48 via timer 38. Timer 38 can run independently or irrespective of the actual time of day and irrespective of the actual day of the week. In blocks 50 and 52, thermostat 10 controls unit 26 as a function of a differential between the actual zone temperature 20 and a currently active manually entered setpoint. In block 54, microprocessor 36 recognizes patterns with the manually entered setpoints. Based on the patterns, in block 56 microprocessor 10 establishes learned setpoint temperatures and corresponding learned times. In block 58, some time after controlling unit 26 in response to the manually entered setpoint temperatures (block 50), automatically switching at the learned time to controlling the temperature conditioning unit in response to the learned setpoint temperature. This might continue until interrupted by block 60, wherein microprocessor 36 encounters another recognized pattern or upon receiving another manual setpoint, at which point unit 26 is controlled in response thereto.

Referring to the example of FIG. 3, a block 62 represents microprocessor 36 receiving temperature feedback signal 20 from temperature sensor 22. Sensor 22 could be incorporated within thermostat 10, as shown in FIG. 1, or sensor 22 could be installed at some other location to sense the room temperature such as the temperature of air 28 entering unit 26. Blocks 64, 66 and 68 represent microprocessor 36 sequentially receiving first, second and third manually entered setpoint temperatures. Blocks 70, 72 and 74 represent thermostat 10 controlling unit 26 at sequential periods in response to a differential between the comfort zone temperature and the various manually entered setpoint temperatures. Block 76 represents assigning timestamps 48 to the various manually entered setpoint temperatures. A block 78 represents microprocessor 36 identifying a learned setpoint temperature based on the first, second and third manually entered setpoint temperatures. In block 80, thermostat 10 controls unit 26 in response to a differential between the learned setpoint temperature and the actual zone temperature. Block 82 represents subsequently receiving a fourth manually entered setpoint temperature. Block 84 represents controlling unit 26 in response to the fourth manually entered setpoint temperature. Some time after that, thermostat 10 returns to controlling unit 26 in response to the learned setpoint temperature, as indicated by block 86.

Although the invention is described with respect to a preferred embodiment, modifications thereto will be apparent to those of ordinary skill in the art. The scope of the invention, therefore, is to be determined by reference to the following claims:

The invention claimed is:

1. A thermostat method for a temperature conditioning unit, wherein the temperature conditioning unit helps control a temperature of a comfort zone, the method comprising:

receiving a first manually entered setpoint temperature, which is assigned a first timestamp;

controlling the temperature conditioning unit in response to the first manually entered setpoint temperature;

receiving a second manually entered setpoint temperature, which is assigned a second timestamp;

controlling the temperature conditioning unit in response to the second manually entered setpoint temperature;

receiving a third manually entered setpoint temperature, which is assigned a third timestamp;

controlling the temperature conditioning unit in response to the third manually entered setpoint temperature;

identifying a learned setpoint temperature based on the first manually entered setpoint temperature, the second manually entered setpoint temperature, and third manually entered setpoint temperature; and controlling the temperature conditioning unit in response to the learned setpoint temperature; and wherein the first timestamp, the second timestamp, and the third timestamp are based on a 24-hour timer and all lie within a predetermined range of each other based on the 24-hour timer.

2. The thermostat method of claim 1, wherein first manually entered setpoint temperature, the second manually entered setpoint temperature, and third manually entered setpoint temperature all lie within 5° F. of each other.

3. The thermostat method of claim 1, further comprising:

after controlling the temperature conditioning unit in response to the learned setpoint temperature, receiving a fourth manually entered setpoint temperature; and after receiving the fourth manually entered setpoint temperature, controlling the temperature conditioning unit in response to the fourth manually entered setpoint temperature.

4. The thermostat method of claim 3, further comprising:

after controlling the temperature conditioning unit in response to the fourth manually entered setpoint temperature, returning to controlling the temperature conditioning unit in response to the learned setpoint temperature.

5. A thermostat method for a temperature conditioning unit, wherein the temperature conditioning unit helps control a temperature of a comfort zone, the method comprising:

receiving a first manually entered setpoint temperature, which is assigned a first timestamp;

controlling the temperature conditioning unit in response to the first manually entered setpoint temperature;

receiving a second manually entered setpoint temperature, which is assigned a second timestamp;

controlling the temperature conditioning unit in response to the second manually entered setpoint temperature;

receiving a third manually entered setpoint temperature, which is assigned a third timestamp;

controlling the temperature conditioning unit in response to the third manually entered setpoint temperature;

identifying a learned setpoint temperature based on the first manually entered setpoint temperature, the second manually entered setpoint temperature, and third manually entered setpoint temperature; and controlling the temperature conditioning unit in response to the learned setpoint temperature; and wherein the first timestamp, the second timestamp, and the third timestamp are based on a 168-hour timer

\* \* \* \* \*